Feb. 17, 1959     R. L. CONGER     2,874,284
NOISE DISCRIMINATOR
Filed April 28, 1955
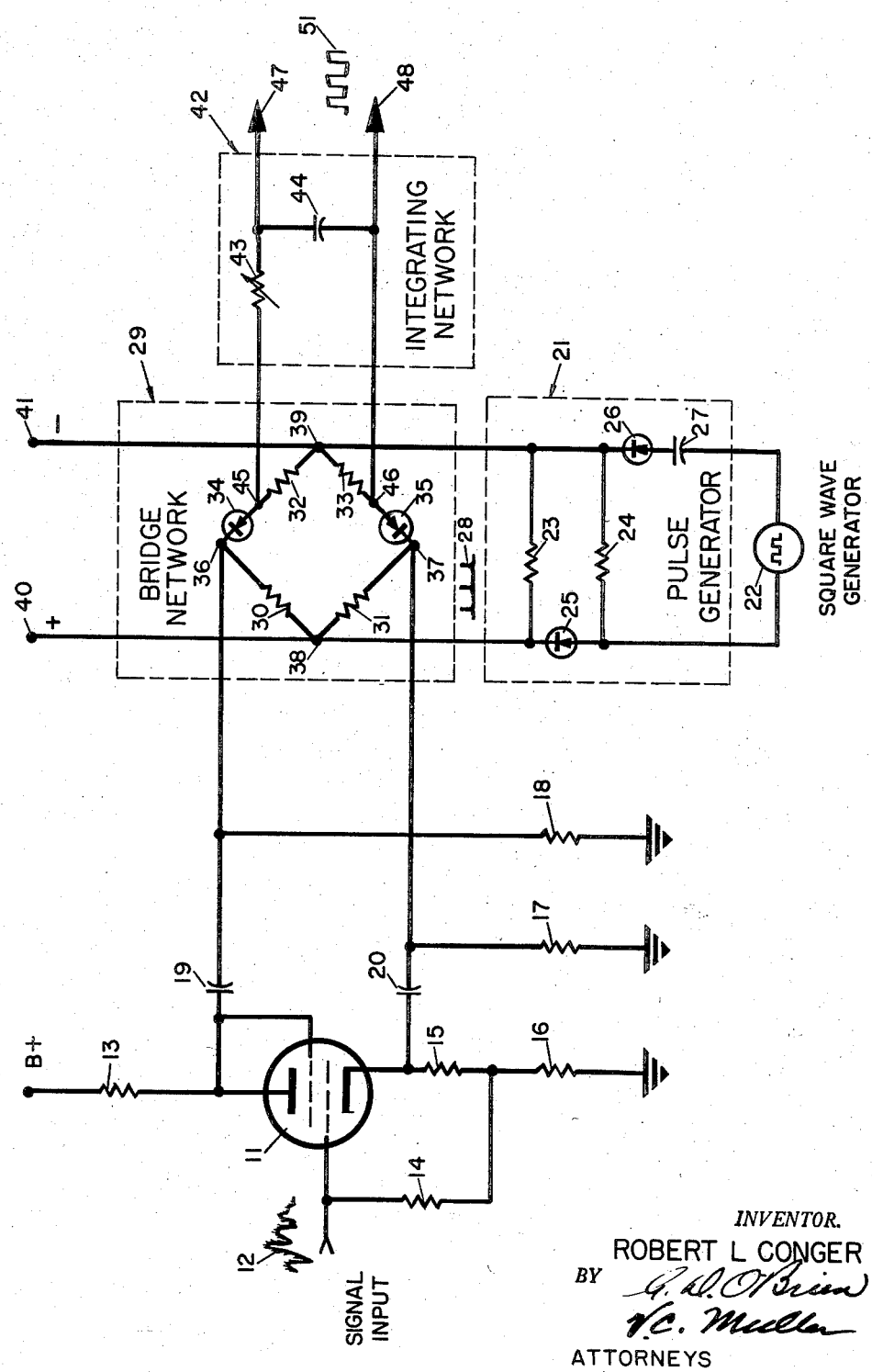
INVENTOR.
ROBERT L CONGER
BY
ATTORNEYS

United States Patent Office 2,874,284
Patented Feb. 17, 1959

2,874,284

NOISE DISCRIMINATOR

Robert L. Conger, Riverside, Calif.

Application April 28, 1955, Serial No. 504,700

5 Claims. (Cl. 250—27)

(Granted under Title 35, U. S. Code (1952), sec. 266)

The invention described herein may be manufactured and used by or for the Government of the United States of America for governmental purposes without the payment of any royalties thereon or therefor.

This invention relates to a noise discriminator and more particularly to an electronic circuit which will reproduce a periodic signal of any shape and eliminate disturbances of any other frequency such as noise and 60 cycle per second interference.

In many instances a filter circuit properly designed may be utilized to separate signals of widely different frequencies. However, it is well known that a filter circuit is not effective for separating noise and 60 cycle per second interference on a periodic signal such as a square wave without seriously distorting the square wave signal. If a filter has a sufficiently narrow band pass to eliminate noise and 60 cycle per second disturbance from a square wave of near 60 cycle per second frequency, then it will only pass the first term of the Fourier series analyses of the square wave. In other words the square wave will be distorted to a sine wave.

The noise discriminator of the present invention works on a different principle. It will reproduce a periodic signal of any shape that it is set to pass and eliminate a disturbance of any other frequency. The output of the discriminator is a wave of the same shape as the input but of a much slower frequency, less than one cycle per second. This output can be observed on a cathode ray oscilloscope with a very slow sweep, or recorded by a recording potentiometer. The apparatus can also be used to generate sine waves or waves of other shapes of very low frequency. The apparatus also has the unique quality of producing the mirror image of the input signal.

The noise discriminator of the present invention consists essentially of an input tube which serves as a phase inverter and impedance matcher and is connected to two of the diagonally opposite terminals of the impedance bridge, and a pulse generator which is connected to the other two diagonally opposite terminals of the impedance bridge. The output is taken from an integrating network which is connected to the impedance bridge adjacent a pair of diodes in the bridge network.

If an input consisting of a square wave of about 80 C. P. S. frequency, a 60 C. P. S. sine wave and random noise is applied to the grid of the input tube, the anode and cathode outputs of the tube are applied to two diagonally opposite terminals of the impedance bridge, and a signal from a square wave generator, at a frequency slightly greater than the 80 C. P. S. signal applied to the input tube, is differentiated, rectified and applied to the other two diagonally opposite terminals of the impedance bridge. The impedance bridge contains a pair of diodes which prevent the signal from passing through to the integrator and output except during the short interval when pulses from the pulse generator are applied to the bridge. Since these occur at a slightly different frequency than the input a small slice of the input passes through during each cycle to the integrator. This results in an output having the same shape as the square wave input which is mixed with noise and the 60 C. P. S. component, but at a much lower frequency.

One object of the present invention is to provide means for reproducing a periodic signal of any shape and eliminating disturbances of any other frequency.

Another object of the present invention is to provide an electronic circuit having an output which is a wave of the same shape as the input but of a much lower frequency, which can be observed on a cathode ray oscilloscope with a very slow sweep, or recorded by a recording potentiometer.

A still further object of the present invention is to provide electronic apparatus which can be used to generate sine waves or waves of other shapes at very low frequencies.

Still another object of the present invention is to provide an electronic circuit which will reproduce the mirror image of an input signal.

Other objects and many of the attendant advantages of this invention will be readily appreciated as the same becomes better understood by reference to the following detailed description when considered in connection with the accompanying drawings wherein:

The figure of the drawing is a schematic circuit diagram representing one preferred embodiment of the present invention.

Referring now to the drawings in detail the tube 11 serves as a phase inverter and impedance matcher and receives an input signal indicated at 12 which may consist of any periodic signal mixed with noise or other interference such as 60 cycle per second pickup. In the present instance the signal input consists of a square wave which is distorted beyond recognition by noise and 60 C. P. S. interference of substantially the same amplitude as the original signal.

The input 12 is applied to the grid of the tube 11 which is provided with a B+ supply through the load resistor 13 and is provided with conventional circuit components such as the resistors 14, 15, 16, 17, and 18 and the coupling condensers 19 and 20.

The pulse generator 21 enclosed in dotted lines may be of any conventional design for producing periodic pulses at a fixed frequency. One type of pulse generator is shown for generating pulses of short duration such as 0.1 millisecond and consists of a square wave generator 22 and a circuit, consisting of resistors 23 and 24, diodes 25 and 26, and condenser 27, which differentiates and rectifies the square wave from the generator 22 to produce a pulse having a waveform such as that indicated at 28. For a discriminator operating at much higher frequencies a pulse of shorter duration than 0.1 millisecond would be needed.

The bridge network 29 enclosed in dotted lines consists of the four legs containing resistance elements 30, 31, 32 and 33 and the two diodes 34 and 35 in series with resistors 32 and 33 respectively in two of the legs of the network 29. Resistors 30, 31, 32 and 33 are preferably of approximately equal resistance but are not necessarily carefully matched. Their value should be between the forward and backward resistance of the diodes 34 and 35, preferably an average of these two values.

The two terminals of the bridge network 36 and 37 are connected to the anode and cathode outputs of the tube 11 through condensers 19 and 20. The terminals 38 and 39 are connected to the output of the pulse generator as shown and also to a plus and minus supply from the leads 40 and 41.

An integrating network 42 consisting of the variable resistance 43 and the condenser 44 is outlined by dotted lines and is connected to the bridge network at terminals 45 and 46 between the diode 34 and resistor 32 and between the diode 35 and resistor 33 respectively. The output of the discriminator is taken off at the leads 47 and 48 across the condenser 44 and provides a waveform such as that indicated at 51.

Operation

The operation of the noise discriminator can be explained with the aid of the circuit diagram in the drawing. The single tube 11 which may be a 6V6 vacuum tube serves as a phase inverter and impedance matcher. A signal input is applied to the grid of the tube 11 which in a typical instance may be a square wave of about 80 C. P. S. frequency, a 60 C. P. S. sine wave, and random noise with each of these components of about the same amplitude and producing a signal such as that illustrated at 12. Actually the input would not be steady as indicated in the drawing but would present a flickering appearance due to the variation of the random noise and the phase difference between the 60 C. P. S. sine wave and the 80 C. P. S. square wave.

The pulse generator for this type of application would produce a pulse of about 0.1 millisecond duration by differentiating and rectifying the square wave from the square wave generator 22.

The signals from the tube 11 through the coupling condensers 19 and 20 are applied to the terminals 36 and 37 of the bridge network. Most of the time this signal cannot reach the output terminals 45 and 46 of the bridge network because the two diodes 34 and 35 are blocked by the voltage applied to the terminals 38 and 39. However, when the pulse is applied to the terminals 38 and 39, the two diodes are unblocked for about 0.1 millisecond. During this interval the signal is allowed to pass through the diodes to the output terminals. Thus if the pulses from the pulse generator are of the same frequency as the input signal a small slice of the input signal will be allowed to pass through the bridge network 29 to the integrating network 42 during every cycle. The phase relationship between the pulses and the signal will determine the part of the signal from which the slice will be taken.

However, if the frequency of the pulses is slightly greater than the frequency of the signal the phase relationship will change slowly and the position of the slice will move slowly across the signal. The slices then go to the integrating network 42 which may have an adjustable time constant. As the successive slices of the periodic signal are applied to the integrating network 42 they build up a charge on the capacitor 44 which is proportional to the amplitude of the slice.

As the phase relationship between signal and pulses slowly changes, the charge on the capacitor 44 will be proportional to the amplitude of the slices applied to it. Thus the output of the noise discriminator which is across the capacitor 44 will be a wave of almost the same shape as the input signal but of a much lower frequency.

Any noise, 60 C. P. S. interference or other disturbance which is not very near the frequency of the pulses will not be reproduced for the slices from these disturbances will change very rapidly in sign and no net charge will be built up on the capacitor 44 in the integrating network.

Distortion of the signal will be proportional to the width of the pulses from the pulse generator 21 and the time constant of the integrating network 42. Distortion caused by the phase inverter tube 11 is not considered since it is of a conventional nature. Distortion due to pulse width can be made arbitrarily small by decreasing the pulse width, but the amplitude of the output of the discriminator is proportional to the pulse width. The width of the pulse will therefore depend on how much distortion can be tolerated and how much output amplitude is needed.

The time constant of the integrating network 42 is also a compromise. A short time constant will allow the output signal strength to rise suddenly, but will not give as good a noise reduction as a long constant. If the difference of frequency between the input signal and the pulses is quite small such as 0.1 C. P. S. for example, a long time constant can be used without serious distortion of the output signal. Under these conditions the apparatus can reproduce a square wave with little distortion, even though the square wave is mixed with noise that distorts it beyond recognition as indicated in the shape of the output signal 51.

Actual photographs of the trace on a cathode ray oscilloscope tube show that the noise discriminator is quite efficient at eliminating noise from a periodic signal. The circuit does not filter out the noise and let the remainder through but synthesizes a new signal built up of the components of the input signal which have a certain frequency. The output has the same shape as the noise-free input but is of a much lower frequency.

The discriminator may obviously be used also to produce very low frequency sine waves or waves of other shapes and can be used to drive a recording potentiometer so as to produce a permanent record of the wave shape.

This circuit may also be adjusted by changing the frequency of the output of the pulse generator 21 to produce pulses at a frequency slightly less than the frequency of the desired input signal component thus scanning the waveform in a backward direction so that the output from the integrating network 42 will produce the mirror image of the desired periodic wave in the input signal.

Obviously many modifications and variations of the present invention are possible in the light of the above teachings. It is therefore to be understood that within the scope of the appended claims the invention may be practiced otherwise than as specifically described.

What is claimed is:

1. A noise discriminator comprising a four terminal bridge network having resistance elements in each arm and a pair of rectifying elements in two adjacent arms thereof, means for applying the input across one pair of diagonally located terminals of said bridge, said rectifying elements being located between said diagonally located terminals and said resistance elements in each of said adjacent arms, a pulse generator circuit adapted to apply periodic pulses across the other diagonally located terminals of the bridge, means for applying a bias voltage across said other diagonally located terminals to prevent current from flowing through said rectifying elements except when said circuit is producing a pulse, the output voltage of said bridge being taken from two additional terminals between the resistance and the rectifying elements in said adjacent arms, and an integrating circuit connected to said two output terminals for developing an output signal.

2. A noise discriminator comprising a four terminal bridge network having resistance elements in each arm and a pair of rectifying elements in two adjacent arms thereof, means for applying the input across one pair of diagonally located terminals of said bridge, said rectifying elements being located between said diagonally located terminals and said resistance elements in each of said adjacent arms, a pulse generator circuit adapted to apply periodic pulses across the other diagonally located terminals of the bridge, means for applying a bias voltage across said other diagonally located terminals to prevent current from flowing through said rectifying elements except when said circuit is producing a pulse, the output voltage of said bridge being taken from two additional terminals between the resistance and the rectifying elements in said adjacent arms, and an integrating circuit having a series resistance and a shunt capacitor connected to said two output terminals for developing an output signal having the same wave shape as the input signal.

3. A noise discriminator comprising a four terminal bridge network having substantially equal resistance elements in each arm and a pair of rectifying elements in two adjacent arms thereof, said resistance elements having a value intermediate the forward and backward resistance of said rectifying elements, means for applying the input across one pair of diagonally located terminals of said bridge, said rectifying elements being located between said diagonally located terminals and said resistance elements in each of said adjacent arms, a pulse generator circuit adapted to apply periodic pulses across the other diagonally located terminals of the bridge, means for applying a bias voltage across said other diagonally located terminals to prevent current from flowing through said rectifying elements except when said circuit is producing a pulse, the output voltage of said bridge being taken from two additional terminals between the resistance and the rectifying elements in said adjacent arms, and an integrating circuit connected to said two output terminals for developing an output signal having the same wave shape as the input signal.

4. A noise discriminator comprising a phase inverter and impedance matching circuit, a four terminal bridge network having equal resistance elements in each arm and a pair of rectifying elements in two adjacent arms thereof, means for applying the output of said phase inverter circuit across one pair of diagonally located terminals of said bridge, said rectifying elements being located between said diagonally located terminals and said resistance elements in each of said adjacent arms, a pulse generator circuit adapted to apply periodic pulses across the other diagonally located terminals of the bridge, means for applying a bias voltage across said other diagonally located terminals to prevent current from flowing through said rectifying elements except when said circuit is producing a pulse, the output voltage of said bridge being taken from two terminals between the resistance and the rectifying elements in said adjacent arms, and an integrating circuit having a series resistance and a shunt capacitor connected to said two output terminals for developing an output signal having the same wave shape as the input signal to said phase inverter.

5. A noise discriminator comprising a four-terminal bridge network having resistance elements in each arm and a pair of rectifying elements in two adjacent arms thereof, means for applying a periodic signal input across one pair of diagonally located terminals of said bridge, said rectifying elements being located between said diagonally located terminals and said resistance elements in each of said adjacent arms, a pulse generator circuit adapted to apply periodic pulses across the other diagonally located terminals of said bridge at a frequency slightly different from the frequency of said input signal, means for applying a bias voltage across said other diagonally located terminals to prevent current from flowing through said rectifying elements except when said circuit is producing a pulse, the output voltage of said bridge being taken from two additional terminals between the resistance and the rectifying elements in said adjacent arms, and an integrating circuit having a series resistance and a shunt capacitor connected to said two output terminals for developing an output signal having a wave shape similar to the input signal.

References Cited in the file of this patent

UNITED STATES PATENTS

| | | |
|---|---|---|
| 2,202,205 | Howe | May 28, 1940 |
| 2,443,195 | Pensyl | June 15, 1948 |
| 2,532,338 | Schlesinger | Dec. 5, 1950 |
| 2,625,662 | Gaynor et al. | Jan. 13, 1953 |
| 2,639,386 | Karpeles | May 19, 1953 |
| 2,662,113 | Schouten et al. | Dec. 8, 1953 |

FOREIGN PATENTS

| | | |
|---|---|---|
| 818,971 | Germany | Oct. 29, 1951 |